United States Patent [19]

Tomisawa et al.

[11] Patent Number: 5,560,484

[45] Date of Patent: Oct. 1, 1996

[54] BLANK FOR A SLEEVE TYPE CASING WITH A COVER FOR RECEIVING A RECORDING MEDIUM

[75] Inventors: Maya Tomisawa, Saku; Kunihiko Muta, Sagamihara, both of Japan

[73] Assignee: TDK Corporation, Tokyo, Japan

[21] Appl. No.: 400,519

[22] Filed: Mar. 7, 1995

Related U.S. Application Data

[63] Continuation of Ser. No. 176,684, Jan. 3, 1994, abandoned, which is a continuation of Ser. No. 16,088, Feb. 10, 1993, abandoned.

Foreign Application Priority Data

Feb. 12, 1992 [JP] Japan .................. 4-013754 U

[51] Int. Cl.⁶ .................. B65B 73/00; B65B 85/30; B65B 17/00
[52] U.S. Cl. .................. 206/307; 206/387.1; 229/931; 229/237
[58] Field of Search .................. 206/387, 494, 206/233, 312, 387.1, 307; 229/DIG. 4, 931, 237

[56] References Cited

U.S. PATENT DOCUMENTS

| | | | |
|---|---|---|---|
| 2,878,987 | 3/1959 | Inman | 229/237 X |
| 3,019,944 | 2/1962 | Nelson et al. | 229/237 X |
| 3,990,574 | 11/1976 | Roccaforte | 206/387 |
| 4,445,612 | 5/1984 | Shepherd | 206/387 |
| 4,445,634 | 5/1984 | Sato | 206/387 X |
| 4,688,673 | 8/1987 | Yabe | 206/387 |
| 4,821,881 | 4/1989 | Yabe | 206/387 |
| 4,978,009 | 12/1990 | Pany | 206/387 X |
| 5,088,602 | 2/1992 | Heyderman et al. | 206/387 |
| 5,103,978 | 4/1992 | Secor | 206/387 |
| 5,143,217 | 9/1992 | Igarashi | 206/387 |
| 5,174,442 | 12/1992 | Kurnit | 206/387 X |
| 5,232,087 | 8/1993 | Schluger | 206/387 X |
| 5,293,994 | 3/1994 | Antik | 206/387 |
| 5,337,916 | 8/1994 | Voss | 229/931 X |
| 5,353,931 | 10/1994 | Antik | 206/387 |

FOREIGN PATENT DOCUMENTS

| | | |
|---|---|---|
| 58-115361 | 8/1983 | Japan . |
| 58-176274 | 11/1983 | Japan . |
| 59-28869 | 2/1984 | Japan . |
| 63-86014 | 4/1988 | Japan . |

*Primary Examiner*—B. Dayoan
*Attorney, Agent, or Firm*—Oblon, Spivak, McClelland, Maier & Neustadt, P.C.

[57] ABSTRACT

A blank for a sleeve type casing with a cover for receiving a recording medium which is formed by punching out a plastic sheet and folding a punched sheet along ruled lines formed in it, and which has a U-shaped notched portion for finger touch at an edge for forming a part of an opening of the casing, wherein the blank has a cover flap with an insertion flap so that the cover flap covers the opening when the blank is formed into a box-like body and a seam-like cut line having a central portion of a U-shape and side portions extending linearly from both ends of the U-shape central portion so as to extend along the root portion of the cover flap.

11 Claims, 4 Drawing Sheets

BLANK FOR A SLEEVE TYPE CASING WITH A COVER FOR RECEIVING A RECORDING MEDIUM

This application is a Continuation of application Ser. No. 08/176,684, filed on Jan. 3, 1994, now abandoned which is a continuation of Ser. No. 08/016,088, filed on Feb. 10, 1993, also abandoned.

BACKGROUND OF THE INVENTION

1. Field of the Invention

The present invention relates to a sleeve type casing for receiving a recording medium such as a tape cassette or a floppy disk, which is prepared by punching out a sheet material with ruled lines for bending.

2. Discussion of Background

Heretofore, tape cassettes and floppy disks in use of audio or video have been protected by putting them in casings made of a material such as a synthetic material, paper or the like. When dust is deposited on the surface of a recording medium such as a magnetic tape or a magnetic disk, a flaw is resulted on the surface, whereby recorded information is lost or there causes erroneous recording or erroneous display. Accordingly, it is necessary to pay attention to the construction of the casing in order to protect a tape cassette or a floppy disk received therein when it is transported or preserved, and to provide easiness for putting-in and drawing-out the tape cassette or the floppy disk.

Description will be made as to form a casing for receiving a video tape cassette, for instance, a sleeve type casing for video tape cassette. A plastic sheet having a large surface area on which printing is formed is punched out to form a large number of blanks. Then, each of the blanks is subjected to line-forming operations by hot pressing so that ruled lines for bending are formed. Then, a blank 10 as shown in FIG. 7 can be obtained. It is possible to form the ruled line for bending in each of the blanks when the blanks are punched out from a plastic sheet.

FIG. 7 shows a blank 10 for a sleeve type casing in a developed form. The blank comprises a front surface area 12, a bottom surface area 14, a rear surface area 16, front side flaps 18 (18a, 18b), back side flaps 20 (20a, 20b) and ear flaps 22 (22a, 22b). The blank is further provided with a ruled line 24 at the border between the front surface area 12 and the bottom surface area 14, ruled lines 26 (26a, 26b) at the borders between the front surface area 12 and the rear side flaps 20, a ruled line 28 at the border between the bottom surface area 14 and the rear surface area 16, ruled lines 30 (30a, 30b) at the borders between the bottom surface area 14 and the ear flaps 22, and ruled lines 32 (32a, 32b) at the borders between the rear surface area 16 and the front side flaps 18.

The blanks having the above-mentioned structure are successively put into a box machine. Each of the blanks 10 are bent so that the flaps 18, 20, 22 which are formed at opposing portions of the blank are respectively overlapped and bonded, whereby left and right side portions 34, 36 are formed in a sleeve type casing 38 for a video tape cassette as shown in FIG. 8. In FIG. 8, numeral 40 (40a, 40b) designates notched portions which provide easiness to draw out the tape cassette by fingers from the opening 42 of the casing 38.

Since the conventional sleeve type casing 38 has the opening 42, dust is apt to enter in the casing and the tape cassette received therein is easily out. Accordingly, the casing 38 is wrapped with a packaging film to close the opening 42 for transportation and preservation. The packaging film has to be broken when the tape cassette is used. Then, there arises again problems that dust enters into the casing through the opening 42 and the tape cassette easily drops.

SUMMARY OF THE INVENTION

It is an object of the present invention to provide a sleeve type casing with a cover for receiving a recording medium which unnecessitates using a packaging film for the purpose of transportation and preservation and is capable of preventing dust from entering during the preservation after purchasing, and preventing the recording medium from coming off.

The foregoing and other objects of the present invention have been attained by providing a blank for a sleeve type casing with a cover for receiving a recording medium which is formed by punching out a sheet material and folding a punched material along ruled lines formed in the same, and which has a notched portion for finger touch at an edge for forming a part of an opening of the casing, the blank being characterized by comprising a cover flap with an insertion flap formed at a portion of the blank so as to oppose the notched portion for finger touch, the cover flap being to cover the opening when the blank is formed into a box-like body and a discretely cut line having a central portion extending substantially along the shape of the notched portion for finger touch and side portions extending linearly from both ends of the central portion so as to extend along the root portion of the cover flap.

A continuously pressed line having a larger depth than the discretely cut line may be formed at the same location instead of the discretely cut line.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
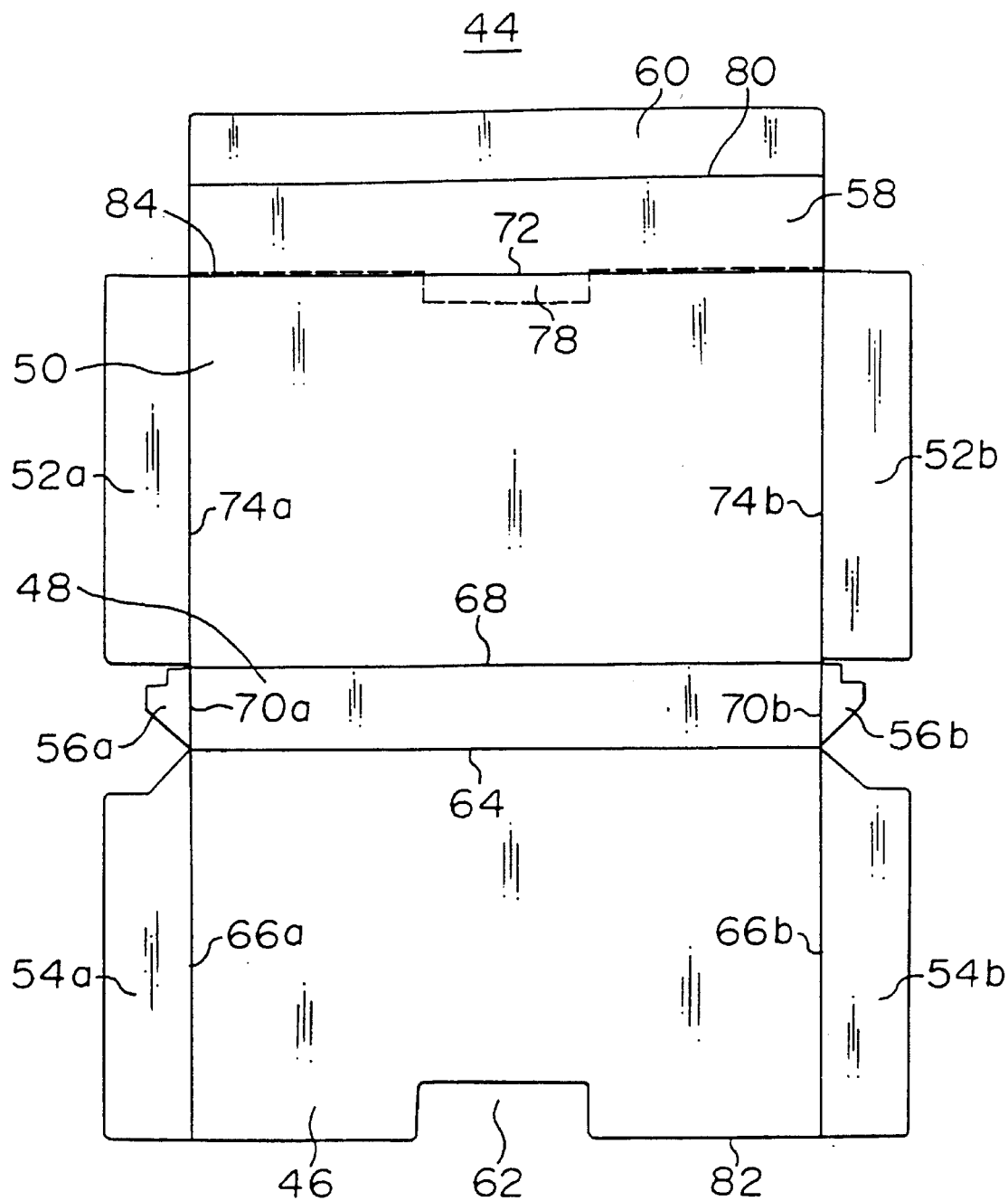
FIG. 1 is a plan view of a blank for a sleeve type casing with a cover for receiving a video tape cassette according to the present invention.

Referring to the drawings preferred embodiments of the present invention will be described. FIG. 1 is a plan view showing a blank for a sleeve type casing with a cover for receiving a video tape cassette according to the present invention. In FIG. 1, reference numeral 44 designates a blank, numeral 46 designates a front surface area of the blank 44, numeral 48 designates a bottom surface area, numeral 50 designates a rear surface area, numeral 52 (52*a*, 52*b*) designates front side flaps, numeral 54 (54*a*, 54*b*) designates back side flaps, numeral 56 (56*a*, 56*b*) designates ear flaps, and numeral 58 designates a cover flap with an insertion flap 60. A notched portion 62 for finger touch is formed at the central portion of a free edge portion of the front surface area 46. The notched portion 62 is preferably formed to have a U-shape.

A ruled line for bending 64 is formed along the border line between the front surface area 46 and the bottom surface area 48; ruled lines for bending 66 (66*a*, 66*b*) are formed along the border lines between left and right opposing sides of the front surface area 46 and the back side flaps 54 (54*a*, 54*b*); a ruled line 68 is formed along the border line between the rear surface area 50 and the bottom surface area 48; ruled lines 70 (70*a*, 70*b*) are formed along the border lines between both sides of the bottom surface area 48 and ear flaps 56 (56*a*, 56*b*); a ruled line 72 is formed along the border line between the rear surface area 50 and the cover flap 58; ruled lines 74 (74*a*, 74*b*) are formed along the border lines between both sides of the rear surface area 50 and the front side flaps 52 (52*a*, 52*b*); and a ruled line 80 is formed along the border line between the cover flap 48 and the insertion flap 60 to be inserted into a box-like body when the blank 44 is folded into a box.

The cover flap 58 is formed integrally with a portion of the blank which opposes an edge portion 82 of the front surface are 46 in which the notched portion 62 for finger touch is formed. The ruled line 72 is formed at the portion corresponding to the border line at the root portion of the cover flap 58. A discretely cut line 84, e.g. a seam-like cut line is formed in the rear surface area 50 at a portion around the root portion of the cover flap 58. Specifically, the discretely cut line has a central portion in which the cut line is along a U-shape for a notched portion 78 for finger touch is formed, and side portions extending linearly from both ends of the U-shaped notched portion 78 so as to extend along the ruled line for bending 72. A continuously pressed line having a larger width than the discretely cut line may be formed at the same location as the discretely cut line.

The blank 44 is prepared by punching out a plan-finished or printed plastic sheet having a large surface area and by forming ruled lines for bending 64, 66, 68, 70, 72, 74 and 80 by hot pressing operations to the blank punched out. The discretely cut line 84 may be formed by the punching operation.

Figure 2:
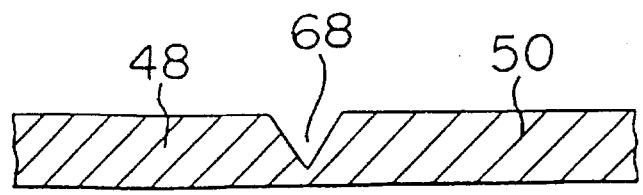
FIG. 2 is an enlarged cross-sectional view showing a ruled line for bending formed in the blank in FIG. 1.
Figure 3:
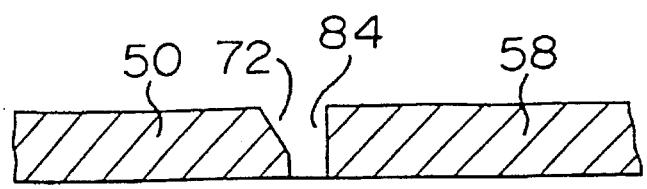
FIG. 3 is an enlarged cross-sectional view showing a portion where a ruled line for bending and a discretely cut line are formed in the blank.

FIG. 2 shows an example of the ruled line 68 for bending in cross section, and FIG. 3 shows the ruled line 72 for bending and the discretely cut line 84 in cross section.

Figure 4:
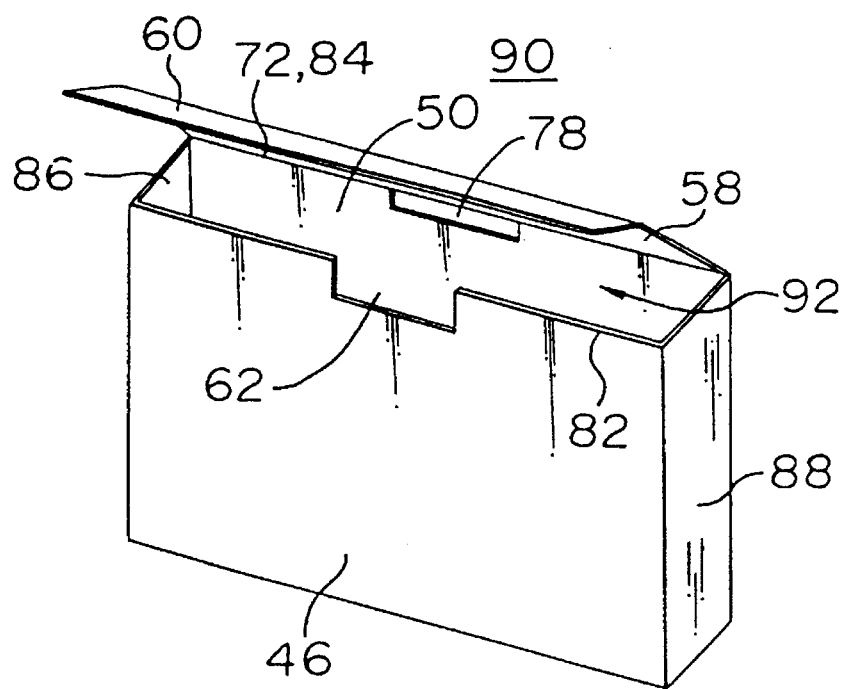
FIG. 4 is a perspective view of a sleeve type casing with a cover for receiving a video tape cassette in which the cover is opened.

The blank 44 is put in a box machine so that the blank is folded along ruled lines. The flaps 52, 54 and 56 which respectively opposes are overlapped, and the overlapped flaps are bonded with each other to thereby form left and right side surfaces 86, 88. Thus, a sleeve type casing 90 with a cover for receiving a video tape cassette is completed as shown in FIG. 4.

Figure 5:
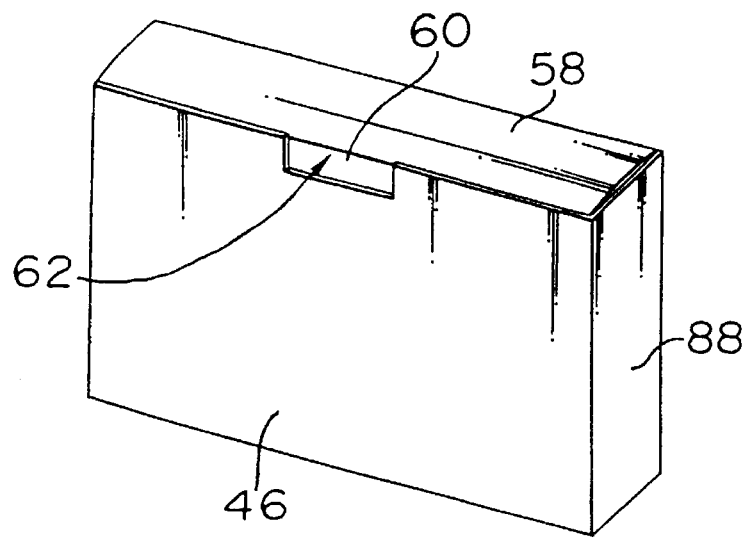
FIG. 5 is a perspective view showing the same casing as in FIG. 4 in which the cover is closed.

During the transportation or preservation, the opening 92 of the casing 90 in which a tape cassette is received is closed with the cover flap 58, and the insertion flap 60 is inserted in the opening 92 as shown in FIG. 5. If a design is previously applied to the outer surface of the casing 90, no wrapping film is necessary. Since the opening 92 is closed without any wrapping material, there is no danger of the invading of dust and the dropping of the tape cassette. A band film may be wound around the casing 90.

Figure 6:
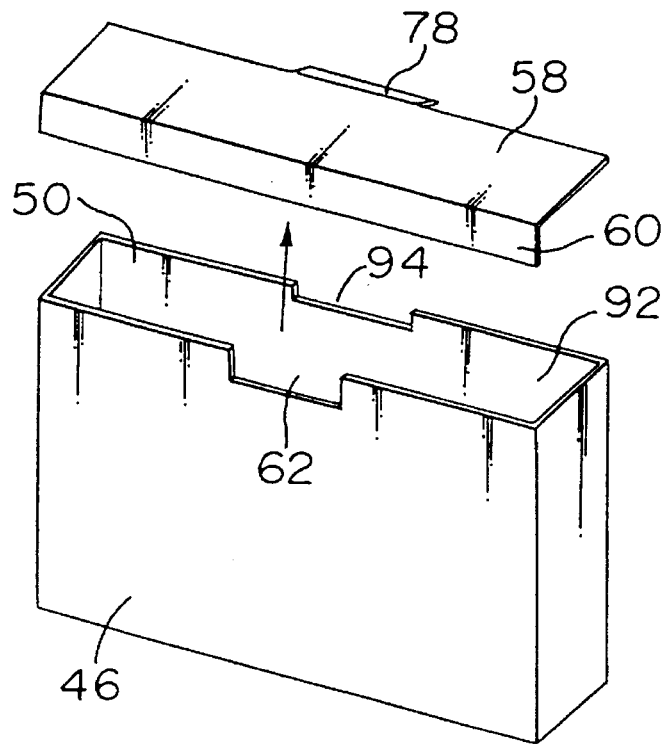
FIG. 6 is a perspective view showing the same casing as in FIG. 4 in which a cover flap is cut away.
Figure 7:
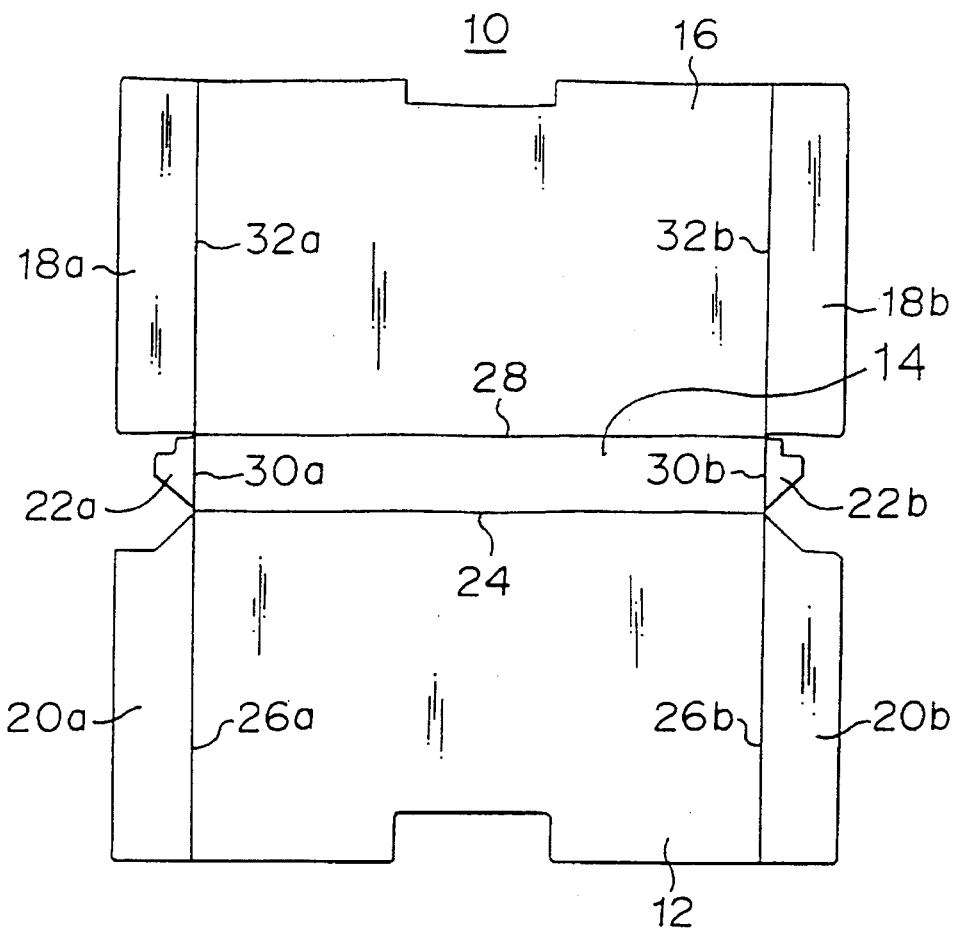
FIG. 7 is a plan view of a conventional blank for a sleeve type casing for receiving a video tape cassette.
Figure 8:
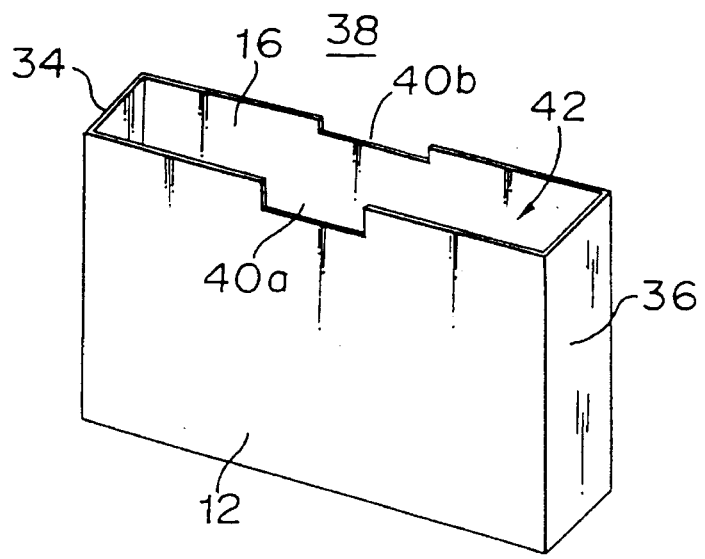
FIG. 8 is a perspective view of a sleeve type casing formed by folding the blank shown in FIG. 7.

When the tape cassette is used after purchasing, the insertion flap 60 is drawn to open the opening 92 then, the tape cassette can be taken out. The casing 90 can be used with the cover flap 58. If the cover flap 58 is not needed, the cover flap 58 can be torn from the discretely cut line 84 or the continuously pressed line to obtain the casing in which the opening 92 is always opened as shown in FIG. 6. In this case, an additional notched portion 94 for finger touch is formed at the central portion of an edge of the rear surface area 50 because the notched portion 78 is torn off together with the cover flap 58.

Thus, in accordance with the present invention, a sleeve type casing with a cover flap can prevent the entering of dust and the dropping of the recording medium during the transportation and preservation without wrapping a packaging film. Since the casing of the present invention has a discretely cut line or a continuously pressed line in an area near the root portion of the cover flap, a user can select to use a casing without the cover flap or with the cover flap. In later case, the entering of dust and the dropping of the recording medium can be eliminated.

Obviously, numerous modifications and variations of the present invention are possible in light of the above teachings. It is therefore to be understood that within the scope of the appended claims, the invention may be practiced otherwise than as specifically described herein.

What is claimed is:

1. A blank for a sleeve type casing comprising:

a sheet forming said blank having front and rear panels;

a cover flap connected to one of said front and rear panels, said cover flap having an insertion flap connected thereto;

a discretely cut line extending along a portion of a border between said cover flap and said one of said front and rear panels, said discretely cut line also extending into said one of said front and rear panels and defining a rectangular shape in said one of said front and rear panels, the blank further including a ruled line extending along said border such that at least part of said ruled line is integrated with said discretely cut line extending along a portion of said border, such that said ruled line and said discretely cut line together form a ruled and discretely cut line, and wherein when viewed in cross-section at a cross-sectional plane perpendicular to said ruled and discretely cut line said discretely cut line has a maximum width smaller than a maximum width of said ruled line.

2. The blank of claim 1, further wherein when viewed in cross-section at said cross-sectional plane perpendicular to said ruled and discretely cut line said ruled and discretely cut line includes inclined ruled portions and discretely cut portions, and wherein said inclined ruled portions slope downwardly into said discretely cut portions.

3. The blank of claim 1, further including a bottom panel connected to both of said front and rear panels and forming a bottom of the sleeve type casing.

4. A blank for a sleeve type casing comprising:

a sheet material having at least front and rear panels;

a cover flap connected to one of said front and rear panels, wherein said cover flap is connected to said one of said front and rear panels at a border;

a ruled and discretely cut line formed by a ruled line integrated with a discretely cut line such that when viewed in cross-section at a ruled and discretely cut position of a cross-sectional plane perpendicular to said ruled and discretely cut line said discretely cut line has a maximum width smaller than a maximum width of said ruled line, and wherein said ruled and discretely cut line extends along a portion of said border, and wherein when viewed in cross-section at said ruled and discretely cut position of said cross-sectional plane perpendicular to said ruled and discretely cut line said ruled and discretely cut line includes an opening extending through said blank, and also at said ruled and discretely cut position said ruled and discretely cut line includes an inclined portion adjacent said opening with said inclined portion sloping downwardly into said opening;

a discretely cut line extending into said one of said front and rear panels to which said cover flap is connected such that said ruled and discretely cut line defines a removable cover flap with the discretely cut line defining a removable notch portion extending into said one of the front and rear panels to which the cover flap is connected.

5. The blank of claim 4, wherein said removable notch portion has a rectangular shape.

6. The blank of claim 4, wherein said discretely cut line is orthogonal to said ruled and discretely cut line.

7. The blank of claim 4, further including a bottom panel connected to both of said front and rear panels and forming a bottom of the sleeve type casing.

8. A blank for a sleeve type casing comprising:

a sheet material having at least front and rear panels;

a cover flap connected to one of said front and rear panels, wherein said cover flap is connected to said one of said front and rear panels at a border; and a ruled and discretely cut line extending along at least a portion of said border, said ruled and discretely cut line including ruled parts and discretely cut parts integrated with one another to form said ruled and discretely cut line, and wherein when viewed in cross-section at a cross-sectional plane perpendicular to said ruled and discretely cut line, said discretely cut parts include openings extending through said blank, and further wherein when viewed in cross-section at said cross-sectional plane said discretely cut parts have a maximum width which is smaller than a maximum width of said ruled parts.

9. The blank of claim 8, wherein when viewed in cross-section at said cross-sectional plane perpendicular to said ruled and discretely cut line, said ruled parts include inclined portions which extend adjacent and slope downwardly into said openings of said discretely cut parts.

10. The blank of claim 8, further including a discretely cut line defining a removable rectangular notch portion.

11. The blank of claim 8, further including a bottom panel connected to both of said front and rear panels and forming a bottom of the sleeve type casing.

* * * * *